March 15, 1966  P. R. BARKER ET AL  3,240,207
PRESSURE SENSOR

Filed May 31, 1963  2 Sheets-Sheet 1

*INVENTORS*
PETER R. BARKER
*BY* LESTER N. WRIGHT

ATTORNEY

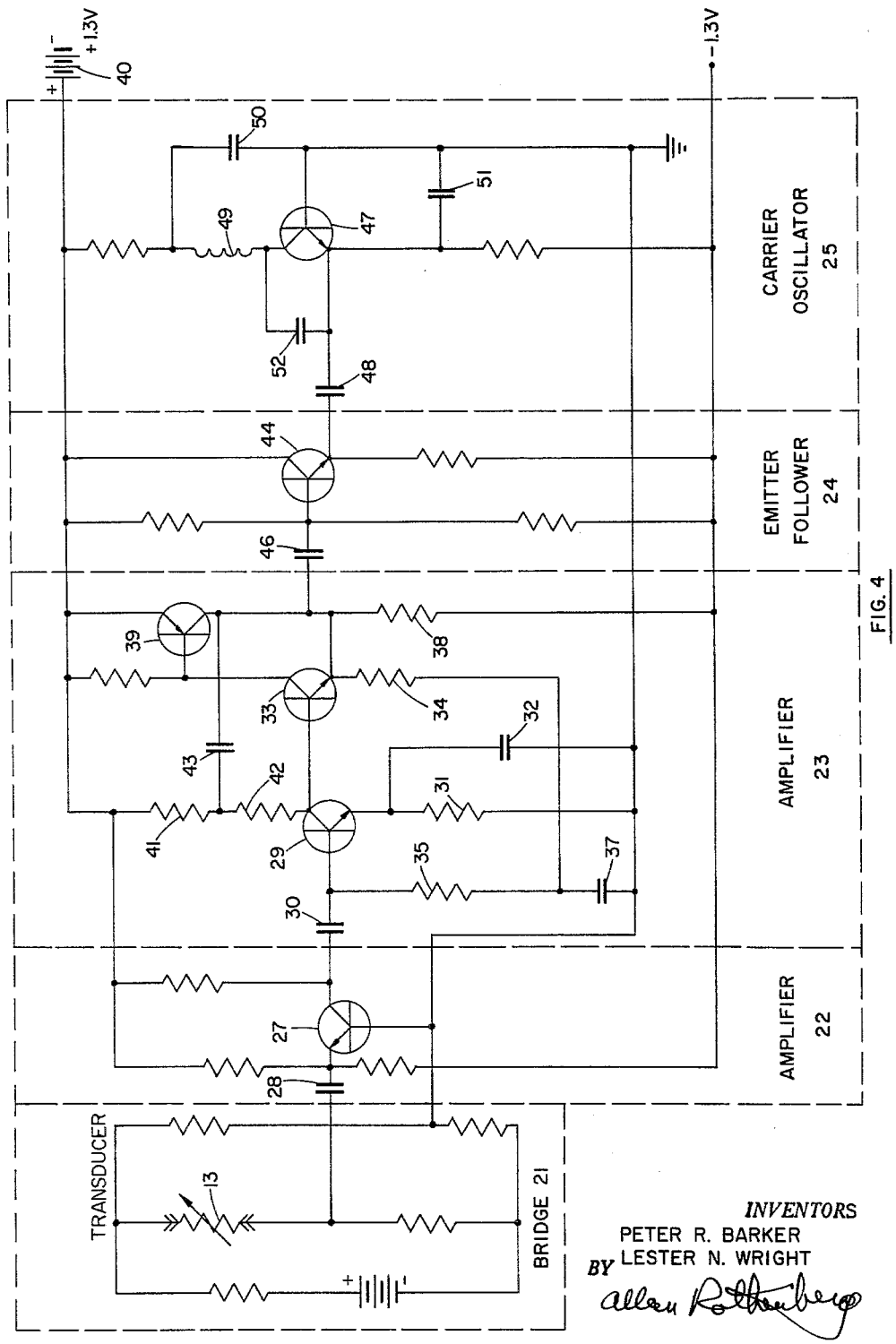

United States Patent Office 3,240,207
Patented Mar. 15, 1966

3,240,207
PRESSURE SENSOR
Peter R. Barker, Manhattan Beach, and Lester N. Wright, Artesia, Calif., assignors to North American Aviation, Inc.
Filed May 31, 1963, Ser. No. 284,416
8 Claims. (Cl. 128—2.05)

This invention relates to a pressure sensor and more particularly to a blood pressure sensor for implanting in a living body.

The continuous acquisition of physiological data has become increasingly important with the use of test animals in space flight research. The blood circulatory system is probably the most important physiological system because of the quantity of information available therefrom. An accurate measurement of blood pressure reflects the condition of the blood vascular system (in the diastolic phase) as well as the action of the heart (in the systolic phase). In addition the blood pressure reflects changes in the average pressure and changes of the pressure phases in relation to each other. The blood pressure is rapidly responsive to stress and is sensitive to relatively small stress levels.

Current methods of externally measuring blood pressure produce useful information but are not generally adaptable to the continuous accurate recording of blood pressure. The use of clinical blood pressure cuffs or catheterization techniques are not susceptible of chronic use as they require body restraints that are unacceptable in space flights or other conditions of experimentation and observation. It is therefore desirable to have a completely internal method for accurate continuous recording of blood pressure for extended periods of time.

An extra-arterial transducer employs a pressure measuring device attached to an intact artery and measures the flexing of the arterial wall which is related to blood pressure. Continuous monitoring of blood pressure by an extra-arterial transducer subjects the artery on which the transducer is placed to stresses that cannot be withstood for prolonged periods of time. Extra-arterial transducer implants have not been maintained for longer than about six weeks in any test animals. Additionally difficulty is encountered in the flexible arteries when the test subject applies a muscular strain as the artery size and shape may change and the blood pressure changes are masked by the dimensional changes. Transducers inserted into the blood stream are dangerous because of the consequent restriction of flow and the extreme danger of clotting at the point of insertion.

It is therefore a broad object of this invention to provide a pressure sensor for a flexible tube.

Thus in the practice of this invention according to a preferred embodiment there is provided an intra-arterial blood pressure sensing system utilizing a flexible aortic graft with a pressure transducer thereon. A segment of an artery is removed and a flexible tubular graft inserted in its place, serially connected to and between adjoining ends of the severed artery. A rigid segment of the graft contains a pressure transducer which determines the pressure differential within the arterial conduit. An amplitude modulated radio frequency transmitter is also implanted in the test subject for transmitting the blood pressure data to a conventional radio receiver. Test animals have withstood implants of the described pressure sensor for as long as eight months without physiological reaction.

Thus it is a broad object of this invention to provide a means for sensing pressure.

It is an object of this invention to measure pressure in a resilient conduit.

It is further object of this invention to sense blood pressure.

It is another object of this invention to provide a pressure sensor that is physiologically inert.

It is an object of this invention to provide an implanted device for remotely signaling pressure.

It is still another object of this invention to internally measure blood pressure and transmit this information outside of a test subject.

Other objects and many of the attendant advantages of this invention will be readily appreciated as the same becomes better understood by reference to the following detailed description when considered in connection with the accompanying drawings wherein:

FIG. 4 shows circuitry for an implantable amplifier and transmitter used to remotely signal blood pressure information.

Throughout the drawings like reference numerals refer to like parts.

Figure 1:
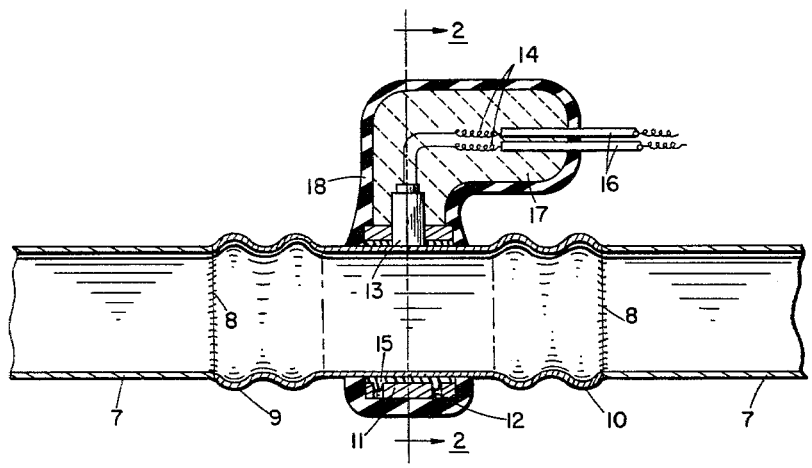
FIG 1 is a longitudinal cross section of an embodiment of the sensor of this invention.
Figure 3:
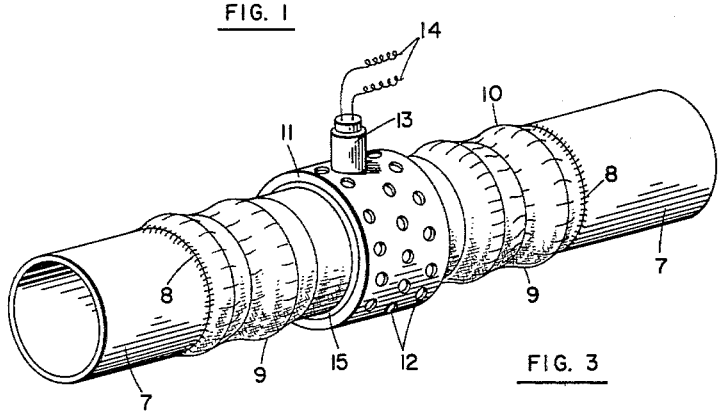
FIG. 3 is a perspective view of a partially assembled pressure sensor.
Figure 2:
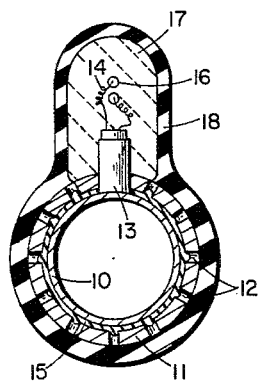
FIG. 2 is a transverse cross section of the embodiment of FIG. 1 taken on lines 2—2.

In an illustrative embodiment of this invention as illustrated in the accompanying drawings there is provided a resilient or flexible tube 10 which is serially secured to the severed adjoining ends of an artery 7 from which a segment has been removed. The graft tube is secured to the artery ends by conventional through and through sutures 8. The resilient tube is preferably fabricated of a material that is inert to body fluids and is somewhat porous so that fibrous tissue can extend through the wall of the tube and secure the intra-arterial endothelium thereto. For best physiological compatibility it is preferred that the tube be a seamless knitted tube of polyethylene terephthalate fiber such a Dacron which is available from E. I. du Pont de Nemours, Inc. of Wilmington, Delaware. Other synthetic fibrous materials can be used in the knitted tube for particular physiological conditions, for example, nylon, acrylic fibers such as Orlon, or tetrafluoroethylene resins such at Teflon, both of which are also available from du Pont.

Likewise the resilient tube can be formed by different methods such as braiding or weaving, however, these are often relatively non-porous and the knit construction is preferred in the presence of normal blood clotting mechanisms. It is also preferred that the resilient tube be formed with a plurality of slight tranverse accordion pleats or folds 9 so as to provide some longitudinal flexibility when inserted in a severed artery. This flexibility is desirable to accommodate slight length variations during body movement and minimize stresses on the anastomoses or junctions between the tubular graft and the artery. The knitted construction with appreciable porosity is preferred also to allow firm attachment of endothelium to the tube wall in the region adjacent to the pressure transducer described hereinafter. Endothelium is a natural tubular lining formed on the inside of the artery and the tubular graft and is sufficiently strong that it can be removed from a used graft in the form of a resilient tube.

Spaced between the ends of the tubular graft 10 there is provided a substantially rigid stainless steel ring 11 circumscribing the tubular graft. The metal ring is, in the illustrative embodiment, constructed of stainless steel which is relatively inert to body fluids. However, it will be readily appreciated that this ring can also be constructed of tantalum, thermosetting resins or other physiologically inert rigid materials. The ring 11 has a plurality of radial holes 12 therethrough to reduce the weight and stress on the anastomoses and to provide keying for an adhesive as hereafter described.

The rigid ring surrounding the resilient tube is employed not only to provide a support for the pressure transducer but also to eliminate pressure transients which obscure measurements or detection of blood pressure variations during body activity. Thus, for example, when a body strain is applied, deformation of the resilient tube occurs laterally of the rigid metal ring. However, no longitudinal or lateral externally imposed strain occurs in the region of the tube secured to the rigid metal ring which constrains bending or bulging of the tube due to muscular strain. Even during extreme body activity and muscular straining the blood pressure sensor described herein provides accurate measurement of the blood pressure. Hence pressure measurements alone are obtained in a tube that is subject to mechanical strains that may be great compared with the strain induced by the internal pressure in the tube.

The metal ring is secured to the Dacron tube by a very thin layer of adhesive 15. The adhesive also extends into the holes 12 in the metal ring to provide a mechanical joint that is strong in shear. Adequate adhesion to the metal may not exist without this keying in the holes. The adhesive should be physiologically inert and is preferably an air setting silica filled polysiloxane elastomer or silicone rubber. Other suitable physiologically inert adhesives could be readily substituted by one skilled in the art. The layer of adhesive adjacent to the fabric graft should be very thin so as not to permeate the tube 10 and interfere with the endothelium attachment within the graft. It is desirable to retain porosity throughout the length of the fabric tube so that longitudinal fibrotic growth can occur within the region in the metal ring. The endothelium will attach to the rough porous surface of the fabric, but firmer attachment is obtained when fibrotic growth occurs in the fabric and there is less danger of portions of the endothelium sloughing off.

Closely fitted within a radial hole in the metal ring 11 is a transversely extending pressure transducer 13 so inserted that the pressure sensitive portion thereof is in contact with the exterior of the resilient tube of the arterial graft. The location of the pressure transducer with the pressure sensitive portion on the exterior surface of the resilient arterial graft tube is preferred to allow firm endothelium attachment at all points along the length of the graft. Any pressure changes in the graft are transmitted through the flexible tube wall and measured by the pressure transducer. The transducer employed herein is physiologically inert and can also be placed in the metal ring in correspondence with a small window in the wall of the arterial graft. If so placed the pressure sensitive portion or other extending portion should be located flush with the interior of the arterial graft wall to avoid any danger of clotting which may occur if the blood flow is restricted. A lining of endothelium will form in the arterial graft and, if the window is small adjacent the pressure transducer, the endothelium will bridge over and form a flexible membrane over the end of the transducer as well as over the rougher tube wall. The preferred pressure transducer used in the described embodiment is 0.10 inch in diameter and an endothelium tube will bridge a window of this size without sloughing. The pressure transducer measures the pressure of the blood as transmitted through the thin resilient tube of endothelium. If mounted in a window in the tube wall, precautions must be taken in construction to avoid fluid leakage around the transducer.

The pressure transducer is preferably a piezoresistive semiconductor type of pressure strain gauge such as that described in U.S. Patent No. 3,049,685. This pressure transducer has a resistance change that is proportional to pressure changes sensed. Other pressure transducers available in suitable sizes can be readily substituted by one skilled in the art such as, for example, other piezoresistive transducers or variable capacitance or inductance types of pressure transducers. An electrically operated sensing device of a very small size and weight is preferred.

Chemically inert electrically conductive leads 14 of a platinum-iridium alloy are connected to the pressure transducer 13 and to a resistance bridge 21 and amplitude modulated radio frequency transmitter 22–25 implantable in the test subject (FIG. 4). The electrical leads are enclosed in silicone rubber tubes 16 for electrical insulation and mechanical protection and the leads are formed into a helical coil to minimize mechanical stresses thereon. Conventional demountable electrical connectors can be employed in the leads between the transducer and transmitter to permit easier surgical techniques. Thus the assembly of graft and transducer may be implanted independently of the transmitter and the two subsequently connected before closing the incision.

The pressure transducer 13 is rigidly secured to the metal ring 11 by an epoxy resin mass 17 which also serves to encapsulate the transducer and a portion of the electrical leads. The epoxy resin is preferably one fully cured with a polymerizing agent that yields substantially no physiologically toxic byproducts and fully cures at a relatively low temperature to avoid damage to the pressure transducer or the Dacron graft tube. Thus it is preferred that the epoxy resin be cured with an organic acid or acid anhydride requiring only moderately high temperatures. Polyamide-polyamine curing agents can also be used for lower temperature curing and are preferred over the primary aliphatic amines and their adducts because of the latter's physiologically irritating characteristics which may be objectionable in chronically implanted grafts. The entire epoxy resin encapsulation and the metal ring are further coated with a layer of silicone rubber 18 to minimize contact between these materials and body fluids and provide a resilient surface for contact with body tissues. The silicone rubber is preferred to be a silica filled polysiloxane with an uncured viscosity of about 50,000 centipoise and is preferably cured with stannous octoate for ease of handling and physiological inertness. Other silicone rubber compositions and curing agents can be substituted by one skilled in the art to provide a physiologically inert resilient covering for the various portions of the graft which may be irritating. A silicone rubber suitable for use in coating the epoxy resin and stainless steel is Silastic RTV–502 available from the Dow Corning Corporation of Midland, Michigan.

The blood pressure changes in the artery provide a radially directed pressure against the sensing end of the transducer which converts these pressure changes to resistance changes. The transducer thus provides a signal that is amplified to amplitude modulate a radio frequency transmitter which is also implantable in the test subject. The transmitted signal is then picked up with a conventional tuned radio receiver outside of the test subject for recording of the data. As illustrated in FIG. 4 the sensor or transducer 13 is connected in a resistance bridge 21 which is coupled to an impedance matching amplifier 22 for matching the low output impedance of the bridge to the higher impedance of an amplifier 23. The amplifier 23 is a three stage temperature compensated amplifier to provide power gain which is coupled to an emitter follower 24 which modulates a carrier oscillator 25. All of the components illustrated in FIG. 4, except the sensor resistor 13 are encapsulated in the same manner as the sensor assembly of FIG. 1, and implanted in the test subject for connection with the sensor resistor which is a portion of the encapsulated transducer. Thus with no external attachments on an animal, a continuous pressure record can be provided by receiving and recording radio frequency signals from the transmitter.

The sensor 13 is in a conventional resistance bridge 21 which is coupled to the emitter of an NPN transistor 27 by a capacitor 28. The base of the transistor 27 is commonly grounded with the opposite side of the bridge to provide a grounded base amplifier particularly useful with the low frequency signals in blood pressure measurements and to provide the above mentioned impedance matching. The collector of the transistor 27 is capacitively coupled by a capacitor 30 to the base of an NPN transistor 29 which is the first stage of the power gain amplifier 23. A parallel R-C network 31, 32 connecting the emitter to ground provides emitter bias for the transistor 29. The collector of the transistor 29 is directly coupled to the base of an NPN transistor 33 to provide a second stage of amplification. A resistive negative feedback is provided between the emitter of the transistor 33 and the base of the transistor 29 by resistors 34 and 35 to reduce distortion in this portion of the circuit. Capacitive coupling of the resistive feedback network by capacitor 37 to ground provides for operation of the feedback network on the low frequencies involved. D.C. bias on the emitter of the transistor 33 is provided by a resistor 38 connected to a −1.3 volt supply voltage which is conveniently supplied by a mercury battery 40. The battery is connected into the transmitter circuit before encapsulating and encapsulated with it to provide power for the transmitter after implanting.

The collector of the transistor 33 is directly coupled to the base of a PNP transistor 39, the collector of which is directly coupled with the emitter of the transistor 33 and the resistive feedback network to provide a temperature compensating feedback to prevent thermal runaway of the transistor 33 and low distortion amplification. Positive supply voltage for this and other transistors in the circuit is provided from a +1.3 volt power supply which is conveniently supplied by the mercury battery 40. In addition to the temperature compensating effect of the transistor 39 some voltage amplification is also obtained which is in phase with the emitter voltage of the transistor 33 thereby providing both current and voltage amplification in the power gain amplifier. A feedback is provided in conjunction with the collector-emitter interconnection of transistors 39, 33, by a voltage divider-capacitive coupling composed of resistors 41 and 42 and capacitor 43 connected to the base of resistor 33. The feedback in this stage of the amplifier is a low frequency compensating network which provides current limiting, minimizes distortion, gives an increase in amplification and gives the amplifier the characteristics of a circuit employing a pentode for power amplification. By using large values for the resistors 34, 35, 41 and 42 and for the capacitors 37 and 43 in the feedback loops, low distortion amplification is obtained for freqeuncy ranges down to one-half cycle per second or less. The signal at the emitter of transistor 33 in the amplifier 23 is capacitively coupled to the base of an emitter follower NPN transistor 44 by a capacitor 46. This stage provides isolation of the carrier oscillator and the amplifier and allows amplitude modulation of the carrier oscillator.

The emitter of transistor 44 is coupled to the carrier oscillator 25 at the emitter of an NPN transistor 47 by a capacitor 48. The carrier oscillator is a modified Colpitts oscillator employing a tank circuit including inductance 49 and capacitors 50, 51 and 52. The inductance 49 is connected to the collector of the transistor 47 in this tank circuit for proper oscillation and also serves as an antenna for the output of the amplifier-oscillator. Amplitude modulation of the oscillator occurs due to an apparent change in the base to emitter resistance of the transistor 44 which directly effects the current flowing in the transistor 47 and its associated tank circuit thereby also directly affecting the voltage drop in the tank circuit which change is radiated from the antenna 49.

Thus, for example, a change in the resistance of the sensor 13 is detected and amplified by the impedance matching transistor 27 and the signal is further directly amplified by the base coupled transistor 29. Similarly the direct coupling between the collector of the transistor 29 and the base of the transistor 33 provides another stage of direct amplification. The collector to base coupling of the transistor 33 to the PNP transistor 39 places the emitter of the transistor 33 and the collector of the transistor 39 in phase and provides a small positive feedback signal for the base of the transistor 33 for further gain therein. The augmented signal from the power gain amplifier 23 induces a signal in the emitter of the emitter follower transistor 44 which appears as a base to emitter resistance change effecting current flow in the tank circuit and amplitude modulating the carrier oscillator 25 and the antenna 49 thereby providing a transmittable signal.

A blood pressure sensor graft embodying the principles of this invention is conveniently prepared by cutting a suitable length of Dacron tubing of the type described, cementing a metal ring with radial holes around a central region of the Dacron tubing with a silicone adhesive as described above, mounting a pressure transducer in a hole in the metal ring and cementing and encapsulating the transducer with an epoxy resin. After the epoxy resin is completely cured and carefully cleaned a layer of silicone rubber is applied by careful brushing to completly shield the epoxy resin and stainless steel from body fluids. After complete curing of the silicone rubber the prepared graft can be sterilized by chemical techniques for implanting in a test subject.

The amplifier-transmitter is assembled by standard soldering techniques using the interconnecting leads for mechanical support of the circuit elements. After assembly the entire device including mercury cells for power supply is encapsulated in an epoxy resin of the same type described above for encapsulating the transducer. After curing the resin is coated with a layer of resilient silicone rubber as described above for physiological inertness. After connection of the sensor and the amplifier-transmitter, the leads therebetween are also coated with silicone rubber during the implanting operation in the test subject. The use of the transistor amplifier-oscillator employing the tank circuit inductance as the antenna permits packaging the transmitter in a very small volume which, when encapsulated, is suitable for implanting with the sensor in a test subject.

Before implanting in a test subject the arterial blood pressure graft and transmitter are preferably calibrated to determine the signal change therein corresponding to known pressure changes. Static calibrations are made of signal change and life testing is performed with an arterial simulator providing an output wave form similar to the pressure variation in an artery at various pressures or pulse rates. Thus, for example, it is preferred to subject the blood pressure graft to 150/50 millimeters of mercury and a pulse rate of 120 per minute for an hour or more before implanting to detect any gross defects in construction.

After sterilization the blood pressure sensor graft can be substituted for a section of blood vessel in a test vessel in a test subject. The abdominal aorta is a convenient location for the arterial graft and standard surgical techniques are employed for removing a segment of the artery and substituting the Dacron tube for the removed segment. Surgical stitching is used to secure the inserted graft to the ends of the severed artery and standard procedures are employed to minimize intra-arterial clotting and insure proper clotting within the walls of the insert. The leads from the pressure transducer are attached to an implantable radio transmitter or as will be apparent they can be brought through the skin of the test subject for attachment to external instrumentation according to standard practices well known to those skilled in the art. An implanted data transmitter is preferred to minimize the possibilities of infection and to permit continuous monitoring without restraint of the test subject. Blood pressure data are obtained during and after postoperative recovery. The calibration of the implanted sensor can be verified by periodic testing by catherization techniques as will be apparent to one skilled in the art.

Blood pressure data is obtained as desired under any conditions of stress or orientation and when implantable electronics are employed no restraint of animal activity is required. Thus, for example, in an approximately 50 pound canine blood pressure was measured with a transducer constructed according to the principles of this invention up to 64 days after implanting, after which time the animal was destroyed to examine the graft and sensor. The absence of complicating physiological effects for a period of eight months in another animal established that chronic implanting of an arterial blood pressure sensor and transmitter constructed according to the teachings of this invention are useful in test animals.

Obviously many modifications and variations of the present invention are possible in light of the above teachings. It is therefore to be understood that within the scope of the appended claims the invention may be practiced otherwise than as specifically described.

What is claimed is:
1. A pressure sensor comprising:
   a flexible pressure containing tube,
   a rigid member around a portion of the tube, said member having a plurality of radial holes therethrough,
   means for adhesively bonding the member to the tube,
   an electrically operated pressure transducer rigidly secured in one of the holes in the member and having a pressure sensitive portion in contcat with the tube, and
   an inert resilient material covering the transducer and the member.

2. A blood pressure sensor comprising:
   a fabric artery replacing tube,
   a metal ring circumscribing the tube and secured thereto, said ring having a radial hole,
   a piezoresistive pressure transducer rigidly secured in the hole in the ring, and
   a covering of physiologically inert resilient material isolating the ring and transducer from body fluids.

3. A body fluid pressure sensor comprising:
   a fabric tube for conducting fluid between severed portions of a natural body fluid conduit,
   a rigid ring circumscribing and secured to the tube, said ring having a plurality of holes therethrough,
   a transversely extending pressure transducer rigidly secured in one of said holes in the ring and having an end in contact with the tube, said transducer having electrical leads,
   a mass of rigid resinous material surrounding the transducer and electrical leads thereto, and
   a coating of inert resilient material on the ring and the resinous material for minimizing fluid contact therewith.

4. A chronically implantable blood pressure sensor comprising:
   a physiologically inert knitted fabric tube having transverse accordion folds for replacing a segment of artery,
   a metal ring circumscribing a portion of the tube, said ring having a plurality of radial holes therethrough,
   a physiologically inert adhesive securing the ring to the exterior of the tube, the interior of the tube being porous and substantially free of said adhesive,
   a piezoresistive pressure transducer in one of the holes in the ring and having a pressure sensitive portion in pressure communication with the interior of the tube,
   an encapsulating mass of rigid resinous material surrounding the transducer and securing the transducer to the ring, and
   a layer of physiologically inert resilient material surrounding the resinous mass and the metal ring for minimizing body fluid contact therewith.

5. A blood pressure sensor comprising a fabric artery replacing tube:
   a metal ring circumscribing said tube, said ring having a radial hole;
   a piezoelectric pressure transducer rigidly secured in the hole in said ring;
   an amplifier for signals from the pressure transducer;
   a radio frequency oscillator amplitude modulated by signals from the amplifier, said oscillator including a tank circuit having an inductance for emitting radio frequency amplitude modulated radiation and a physiologically inert coating covering said ring, said amplifier and said oscillator.

6. A chronically implantable blood pressure sensor comprising:
   a physiologically inert knitted fabric tube having transverse accordion folds for replacing a segment of artery,
   a metal ring circumscribing a portion of the tube, said ring having a plurality of radial holes therethrough,
   a physiologically inert adhesive securing the ring to the exterior of the tube, the interior of the tube being porous and substantially free of said adhesive,
   a piezoresistive pressures transducer in one of the holes in the ring and having a pressure sensitive portion in pressure communication with the interior of the tube,
   an encapsulating mass of rigid resinous material surrounding the transducer and securing the transducer to the ring,
   a layer of physiologically inert resilient material surrounding the resinous mass and the metal ring for minimizing body fluid contact therewith,
   a resistance bridge containing the pressure transducer,
   an impedance matching amplifier connected to the bridge for amplifying signals therefrom,
   a temperature compensated amplifier connected to the impedance matching amplifier for amplifying signals therefrom,
   an emitter follower connected to the temperature compensated amplifier, and
   a carrier oscillator for generating a radio frequency signal,
   said emitter follower further connected to the carrier oscillator for amplitude modulation of said radio frequency signal in response to signals received from the temperature compensated amplifier, and
   said carrier oscillator including a tank circuit having a current carrying inductance means for radiating energy which is amplitude modulated in response to a measured pressure.

7. A pressure sensor comprising:
   a flexible pressure containing tube,
   a rigid ring around a portion of the tube, said ring having a radial hole,
   a pressure transducer rigidly secured in the radial hole in the ring and having a pressure sensitive portion in pressure communication with the pressure in the tube,
   a resistance bridge containing the pressure transducer,
   an impedance matching amplifier connected to the bridge for amplifying signals therefrom,
   a temperature compensated amplifier connected to the impedance matching amplifier for amplifying signals therefrom,
   an emitter follower connected to the temperature compensated amplifier,
   a carrier oscillator for generating a radio frequency signal,
   said emitter follower further connected to the carrier oscillator for amplitude modulation of said radio frequency signal in response to signals received from the temperature compensated amplifier, and said carrier oscillator including a tank circuit having a current carrying inductance means for radiating energy which is amplitude modulated in response to a measured pressure.

8. A pressure sensor comprising:

a flexible pressure containing tube;

a rigid member around a portion of the tube and having a radial hole;

a pressure transducer rigidly secured to the rigid member extending into said hole and having a pressure sensitive portion in pressure communication with the exterior of the tube; and a rigid resinous material encapsulating the transducer and a portion of the rigid member.

References Cited by the Examiner

UNITED STATES PATENTS

| | | | |
|---|---|---|---|
| 1,953,466 | 4/1934 | Corwin | 121—2.05 |
| 2,405,265 | 8/1946 | McAlpine | 128—2.05 |
| 2,634,721 | 4/1953 | Greenwood | 128—2.05 |
| 3,124,132 | 3/1964 | Sullivan | 128—2.05 |
| 3,142,988 | 8/1964 | Love | 72—388 |

RICHARD A. GAUDET, *Primary Examiner.*

LOUIS R. PRINCE, SIMON BRODER, *Examiners.*